(12) United States Patent
Delmerico et al.

(10) Patent No.: US 8,237,301 B2
(45) Date of Patent: Aug. 7, 2012

(54) POWER GENERATION STABILIZATION CONTROL SYSTEMS AND METHODS

(75) Inventors: Robert William Delmerico, Clifton Park, NY (US); Rajni Kant Burra, Bangalore (IN)

(73) Assignee: General Electric Company, Niskayuna, NY (US)

( * ) Notice: Subject to any disclaimer, the term of this patent is extended or adjusted under 35 U.S.C. 154(b) by 817 days.

(21) Appl. No.: 12/023,368

(22) Filed: Jan. 31, 2008

(65) Prior Publication Data
US 2009/0194995 A1 Aug. 6, 2009

(51) Int. Cl.
*F03D 9/00* (2006.01)
*H02P 9/04* (2006.01)

(52) U.S. Cl. .................................................. 290/44
(58) Field of Classification Search .................... 290/44
See application file for complete search history.

(56) References Cited

U.S. PATENT DOCUMENTS

| | | | | |
|---|---|---|---|---|
| 3,752,420 | A * | 8/1973 | Osder | 244/181 |
| 4,189,648 | A * | 2/1980 | Harner | 290/44 |
| 4,189,658 | A * | 2/1980 | Schleinkofer | 378/144 |
| 4,445,180 | A * | 4/1984 | Davis et al. | 700/289 |
| 5,185,585 | A * | 2/1993 | Newell et al. | 331/46 |
| 5,198,745 | A * | 3/1993 | Larsen et al. | 322/58 |
| 6,924,565 | B2 * | 8/2005 | Wilkins et al. | 290/44 |
| 7,345,373 | B2 * | 3/2008 | Delmerico et al. | 290/44 |
| 7,372,709 | B2 * | 5/2008 | Mazumder et al. | 363/16 |
| 7,680,562 | B2 * | 3/2010 | Delmerico et al. | 700/297 |
| 7,761,190 | B2 * | 7/2010 | Delmerico et al. | 700/297 |
| 7,827,813 | B2 * | 11/2010 | Seem | 62/186 |
| 7,952,232 | B2 * | 5/2011 | Burra et al. | 307/64 |
| 2005/0141248 | A1 * | 6/2005 | Mazumder et al. | 363/39 |
| 2006/0062034 | A1 * | 3/2006 | Mazumder et al. | 363/131 |
| 2007/0120369 | A1 * | 5/2007 | Delmerico et al. | 290/44 |
| 2008/0179409 | A1 * | 7/2008 | Seem | 236/49.3 |
| 2009/0085354 | A1 * | 4/2009 | Tan et al. | 290/44 |
| 2009/0230689 | A1 * | 9/2009 | Burra et al. | 290/55 |
| 2010/0008119 | A1 * | 1/2010 | O'Brien et al. | 363/132 |
| 2010/0057258 | A1 * | 3/2010 | Clanin | 700/276 |
| 2010/0117361 | A1 * | 5/2010 | Christensen | 290/44 |
| 2010/0142237 | A1 * | 6/2010 | Yuan et al. | 363/97 |
| 2011/0018281 | A1 * | 1/2011 | Tan et al. | 290/55 |
| 2011/0074151 | A1 * | 3/2011 | Burra et al. | 290/44 |
| 2011/0273129 | A1 * | 11/2011 | Coe et al. | 320/101 |

(Continued)

FOREIGN PATENT DOCUMENTS
EP 0228497 A1 7/1987
(Continued)

OTHER PUBLICATIONS
U.S. Appl. No. 12/023,368, Office Action, Sep. 15, 2010.
(Continued)

*Primary Examiner* — Pedro J Cuevas
(74) *Attorney, Agent, or Firm* — Ann M. Agosti (57) ABSTRACT

A stabilization system for a power generation system including non-conventional energy source coupled to a utility grid, the stabilization system comprising: a deadband limiter configured for detecting when a signal of the power generation system is outside of a signal range; a power shaper configured for providing a transient power generation adjustment signal in response to the signal being outside of the signal range; and a limit controller to configured to prevent the adjustment signal from causing the energy source of the power generation system to operate outside of at least one operating constraint.

14 Claims, 7 Drawing Sheets

U.S. PATENT DOCUMENTS

2011/0285130 A1* 11/2011 Thisted .......................... 290/44
2012/0061963 A1* 3/2012 Thisted .......................... 290/44
2012/0083926 A1* 4/2012 Seem ........................... 700/276

FOREIGN PATENT DOCUMENTS

WO 03023224 3/2003
WO 2004027959 4/2004

OTHER PUBLICATIONS

M. A. Hassouneh et al., "Washout Filters in Feedback Control: Benefits, Limitations and Extensions," Proceedings of the 2004 American Control Conference, Jun. 30-Jul. 2, 2004, pp. 3950-3955.

* cited by examiner

POWER GENERATION STABILIZATION CONTROL SYSTEMS AND METHODS

BACKGROUND

The embodiments disclosed herein relate generally to energy sources with less grid coupled rotating inertia, or other forms of stored energy, than conventional power generators and, more specifically, to providing stabilization control for such non-conventional energy sources. Non-conventional energy sources are variable energy sources that do not generate power at nominal system frequency (e.g., 60 Hz) and are therefore coupled to the grid using fast acting power electronics and controls.

Wind-turbine generators (WTGs) and wind-plants are typically designed to deliver constant active and reactive power to a utility grid with the delivered power being independent of system frequency. This is accomplished by decoupling the rotor inertia and speed from the grid using fast acting power electronics and controls. Due to increases in wind-plant size and penetration, some utilities are now requiring that wind-plant and wind-turbine controls provide enhanced capabilities such as frequency stabilization.

Conventional synchronous generators naturally respond to frequency disturbances due to the grid coupled rotating inertia and governor controls of such generators. Some utility operators require that wind turbines respond in a similar way to frequency disturbances. Specifically, a short duration power increase (for example, five percent of rated power) may be needed when frequency dips below a threshold.

It is a well-known characteristic of utility systems that the grid frequency tends to decrease when the load exceeds the generation and to increase when the generation exceeds the load. Such decreases or increases may occur in a monotonic manner, an oscillating manner, or combinations thereof when the grid is subjected to a sudden change in the balance between generation and load. It is a consideration in the design of such a system that any method to achieve compensation of such decreases or increases should be one that does not cause unacceptable coupling between grid oscillatory modes and the wind turbine mechanical oscillatory modes.

Modern wind plants include the capability to curtail output power below the level available based on wind conditions. Utility grid operators sometimes require curtailment if the available grid power is not needed by the utility. Continuous curtailment may also be required by utility operators to provide operating range for the wind plant to increase power output when frequency decreases. However, curtailment has the undesired consequence of reducing revenues produced by the wind plant.

BRIEF DESCRIPTION

For non-conventional energy sources, such as wind turbines, it is desirable to have a power response initiated for sufficiently large frequency events that can utilize the stored energy in the wind turbine rotor to temporarily increase the delivered power and that minimize interaction with grid oscillatory modes. In one embodiment, a power response is shaped to provide such compensation.

More specifically, in one embodiment, a stabilization system is provided for a power generation system including a non-conventional energy source, and the stabilization system comprises a deadband limiter configured for detecting when a signal of the power generation system is outside of a signal range, a power shaper configured for providing a transient power generation adjustment signal in response to the signal being outside of the signal range, and a limit controller configured to prevent the adjustment signal from causing the energy source of the power generation system to operate outside of at least one operating constraint.

In another embodiment, a stabilization system for a wind power generation system including a wind power generator comprises: a deadband limiter configured for detecting when a signal is outside of a respective signal range, wherein the signal comprises a frequency; a power shaper configured for providing a transient power generation adjustment signal in response to the signal being outside of the respective signal range; and a limit controller configured to prevent the adjustment signal from causing the wind power generator to rotate at a speed outside of a speed range.

In another embodiment, a stabilization method for a wind power generation system including a wind power generator comprises: detecting when a frequency signal is outside of a respective signal range; providing a transient power generation adjustment signal in response to the signal being outside of the respective signal range while not causing the wind power generator to rotate at a speed outside of a speed range.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
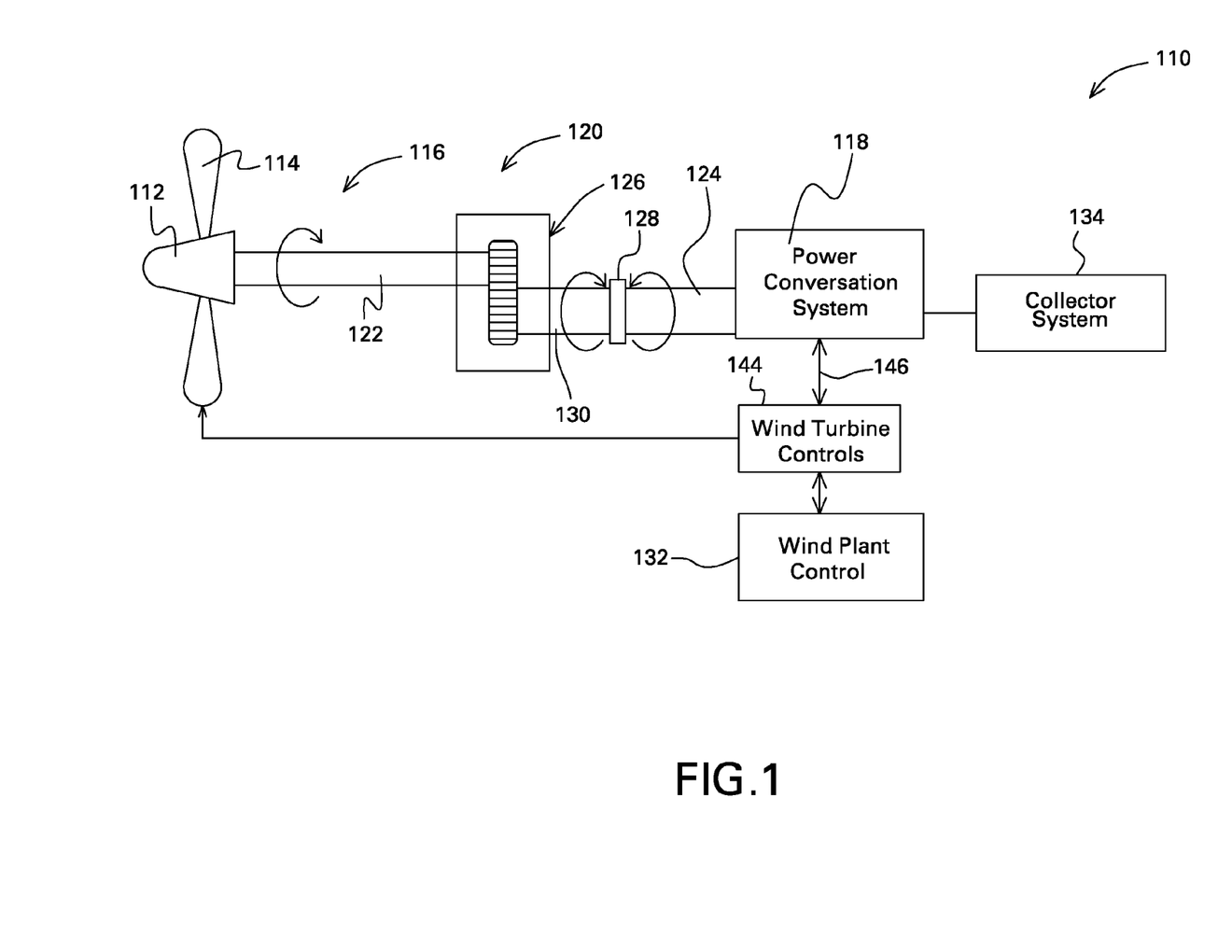
FIG. 1 is a high level block diagram of a typical wind turbine.

Referring generally to FIG. 1, a wind turbine system 110 operable to generate electric power is illustrated. The wind turbine system 110 comprises a hub 112 having multiple blades 114. The blades 114 convert the mechanical energy of the wind into a rotational torque, which is further converted into electrical energy by the wind turbine system 110. The wind turbine system 110 further includes a turbine portion 116 that is operable to convert the mechanical energy of the wind into a rotational torque and a power conversion system 118 that is operable to convert the rotational torque produced by the turbine portion 116 into electrical power. A drive train 120 is provided to couple the turbine portion 116 to the power conversion system 118. The wind turbine power conversion system 118 typically comprises a doubly fed asynchronous generator with a power electronic converter for rotor field control or a synchronous generator for use with a full power electronic converter interface to collector system 134.

The turbine portion 116 includes a turbine rotor low-speed shaft 122 that is coupled to the hub 112. Rotational torque is transmitted from rotor low-speed shaft 122 to a generator shaft 124 via drive train 120. In certain embodiments, such as the embodiment illustrated in FIG. 1, drive train 120 includes a gear box 126 transmitting torque from low-speed shaft 122 to a high speed shaft 130. High speed shaft 130 is coupled to power conversion system shaft 124 with a coupling element 128.

Power conversion system 118 is coupled to wind turbine controls 144. Wind turbine controls 144 receive signals 146 from the power conversion system that are representative of the operating parameters of the system. Wind turbine controls 144, in response, may generate control signals, for example a pitch signal 156 to change the pitch of blades 114 or a torque signal for the power conversion system. Wind turbine controls 144 are also coupled to a wind plant controller 132.

Figure 2:
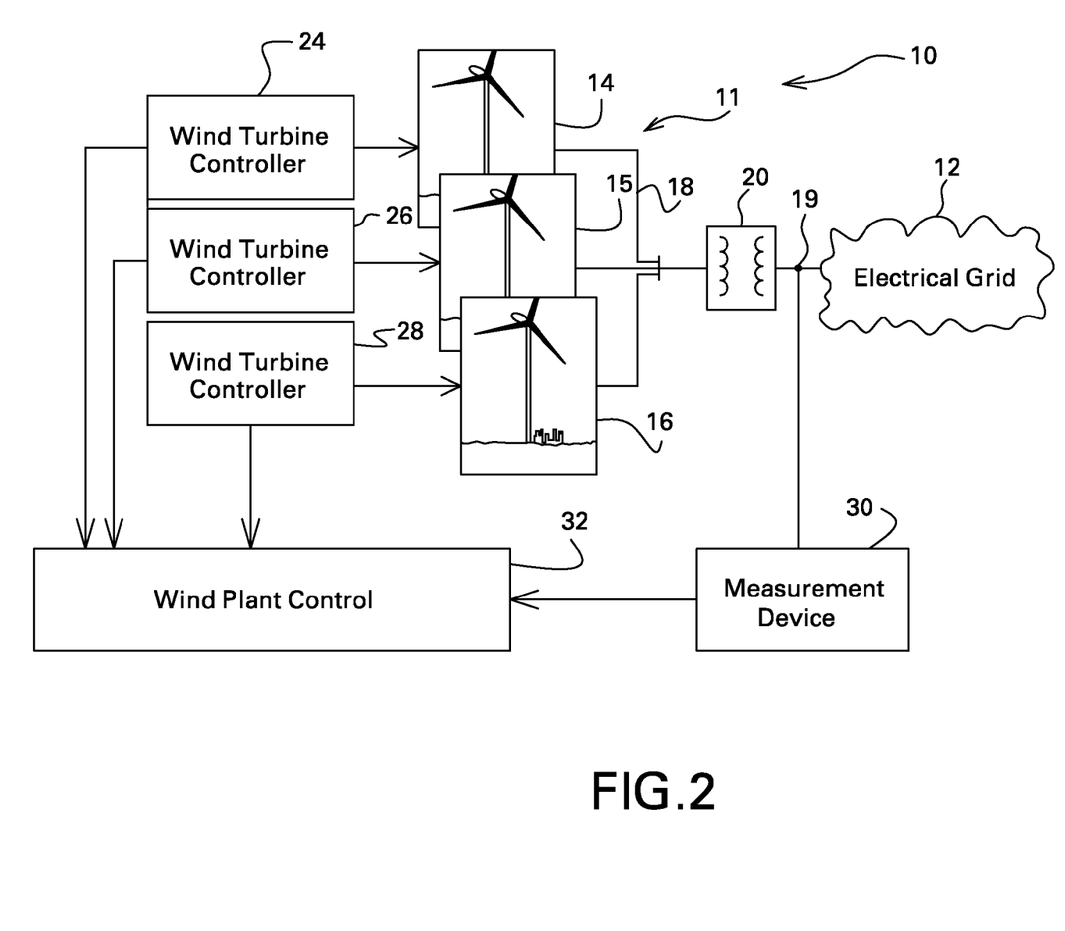
FIG. 2 is a high level block diagram of a wind plant.

Referring to FIG. 2, an electrical power generation system 10 for generating electrical power is illustrated. For purposes of illustration, the electrical power generation system 10 includes a wind plant 11 electrically coupled to an electrical grid 12. The electrical grid 12 is utilized to transfer electrical power from the wind plant 11 to electrical loads.

The wind plant 11 is provided to generate electrical power utilizing wind energy. The wind plant 11 includes wind turbines 14, 15, 16 (more generally referenced as "energy sources"), a collector system 18, a transformer 20, wind turbine controllers 24, 26, 28, a measurement device 30, and a wind plant controller 32. It should be noted that a number of wind turbines utilized in the wind plant 11 can vary. For example, the number of wind turbines in the wind plant 11 can be greater than three wind turbines or less than or equal to three wind turbines.

The wind turbines 14, 15, 16 are provided to generate voltages and currents utilizing wind energy. The wind turbines 14, 15, 16 are operably controlled utilizing the wind turbine controllers 24, 26, 28, respectively, which communicate with the wind turbines 14, 15, 16, respectively.

The wind turbine controllers 24, 26, 28 are configured to generate command signals which control operation of the wind turbines 14, 15, 16, respectively. Further, the wind turbine controllers 24, 26, 28 are provided to measure operational parameters associated with the wind turbines 14, 15, 16 respectively. The wind turbine controllers 24, 26, 28 operably communicate with the wind plant controller 32.

The collector system 18 is electrically coupled to the wind turbines 14, 15, 16 and routes voltages and currents from each of the turbines to the power transformer 20. The power transformer 20 receives the voltages and currents from the wind turbines 14, 15, 16 and outputs a voltage and a current having desired characteristics onto the electrical grid 12. For example, the power transformer 20 can output a voltage having a desired amplitude and a current having a desired amplitude onto the electrical grid 12.

In one embodiment the measurement device 30 is electrically coupled to a point of interconnection 19 between the transformer 20 and the electrical grid 12. The measurement device 30 is configured to measure electrical parameters associated with the electrical grid. For example, the measurement device 30 is configured to measure a voltage level (Vpoi) at the point of interconnection 19, a real power level (Pn) at the point of interconnection 19, and a frequency level (Fn) at the point of interconnection 19. It should be noted that the measurement device 30 can measure parameters on either side of the transformer 20 or at individual turbines.

The wind plant controller 32 is provided to control operation of the wind turbines 14, 15, 16 based on measured or estimated parameter values at the point of interconnection 19 associated with either the wind plant 11 or the electrical grid 12. The wind plant controller 32 is configured to generate command messages that are received by the wind turbine controllers 24, 26, 28 for controlling operation of the wind turbines 14, 15, 16, respectively.

Figure 3:
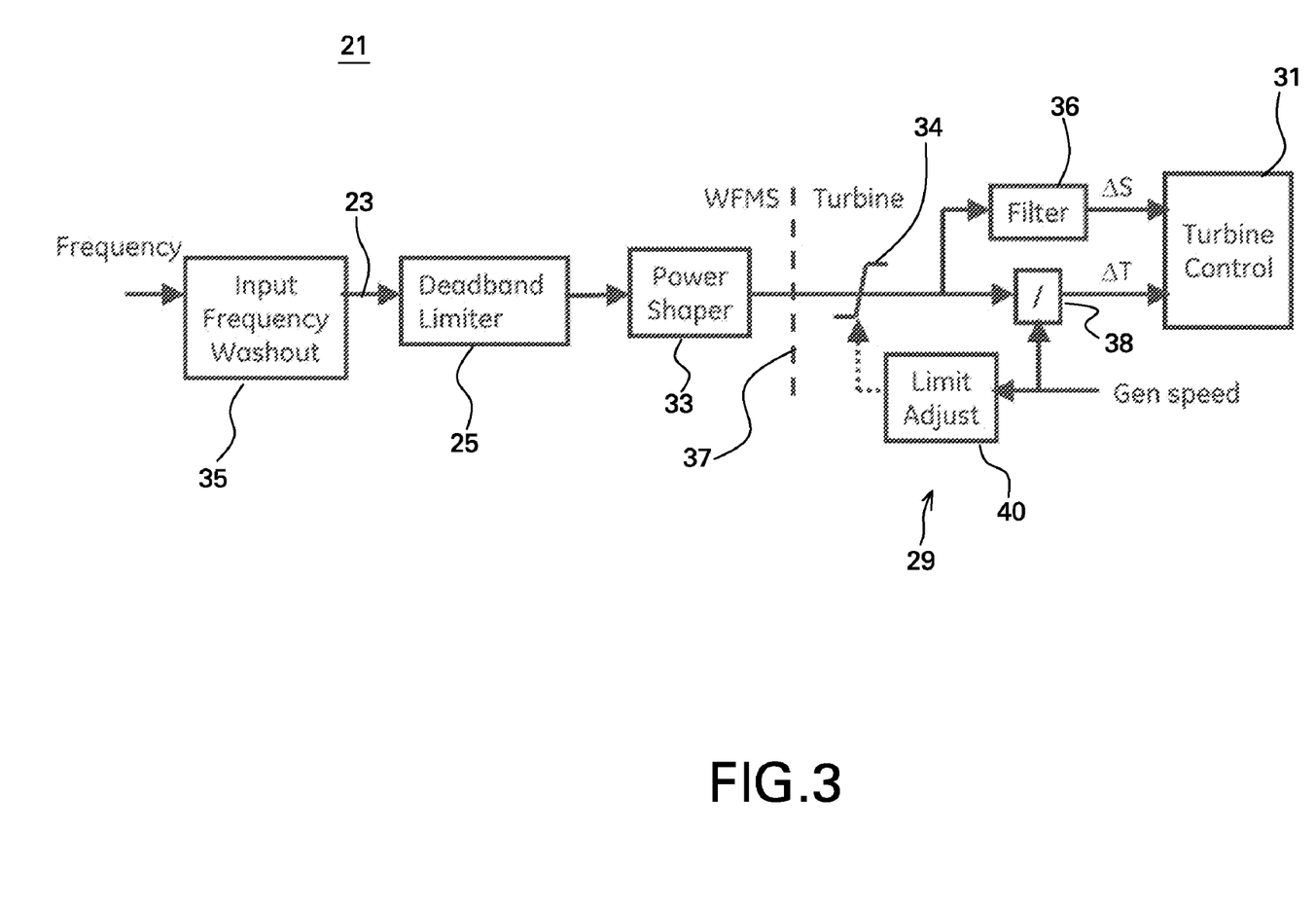
FIG. 3 is a high level block diagram of a control system in accordance with one embodiment disclosed herein.

FIG. 3 is a high level block diagram of a control system in accordance with one embodiment disclosed herein comprising a stabilization system 21 for a power generation system including an energy source having a rotating inertia fully decoupled from the utility grid by a power electronic converter. Stabilization system 21 comprises: a deadband limiter 25 configured for detecting when a signal 23 of power generation system 10 is outside of a signal range; a power shaper 33 configured for providing a transient power generation adjustment signal in response to the signal being outside of the signal range; and a limit controller 29 configured to prevent the adjustment signal from causing the energy source of the power generation system to operate outside of at least one operating constraint.

A temporary power boost may be obtained by temporarily absorbing energy from the energy source. For wind turbines, the additional energy is available from the turbine inertia and from excess wind. If desired, other forms of energy storage, besides inertia (such as battery storage) can also used. In one example, the power may be increased by five to ten percent for up to ten seconds. Providing a transient response has several benefits in addition to grid stability, including, for example, use of stored energy that would not otherwise be available at the turbine output without the need to build in operating margin (e.g., by curtailed mode operation).

The signal 23 may comprise any appropriate signal with one example comprising a signal corresponding to system frequency. The signal may be obtained either by direct measurement of the respective signal or by measurement of another signal and computations to obtain the respective signal.

Additionally, although wind turbines are illustrated as the energy sources, the concepts disclosed herein are believed to be applicable to any non-conventional energy sources with several other examples including battery energy storage, microturbines, and fuel cells. In wind turbine embodiments, for example, the power that obtained from stabilization system 21 is not supported by the wind, so the turbine will slow down to provide the power from the spinning inertia. In such embodiments, it is desirable to maintain the adjustment signal long enough to obtain a desired power pulse before allowing system to recover while operating under energy source constraints. In one specific example, the energy source comprises a generator with a constraint on the rotation speed of the generator.

FIG. 3 additionally illustrates an input frequency washout 35 configured for tracking slow variations in grid frequency and used for calculating frequency deviations around the center point. In this embodiment, the deadband limiter 25 is configured to limit the frequency deviation signal between frequency threshold values determined by the application. Utility grid frequency will have a nominal value that is typically either 50 or 60 Hertz. However, the frequency may drift somewhat such that the center point is at a different value such as 59.9 Hz rather than 60 Hz, for example. Input frequency washout 35 is used to find the actual frequency rather than the nominal. One example technique is described in Hassouneh et al., "Washout Filters in Feedback Control: Benefits, Limitations and Extensions," Proceeding of the 2004 American Control Conference, Jun. 30-Jul. 2, 2004, pages 3950-55. Typically the frequency is measured at a substation of the wind plant, but measurement at that location is not required.

Frequency deadband limiter 25 is used to limit the response of stabilization system 21 to sufficiently large events. Frequency will always vary somewhat due to dithering that occurs when loads come on and off the system. For example, load variation typically affects frequency by about 0.05 Hz, depending on the system. Stabilization system 21 is used for more significant events that occur when a sudden difference is present between load and generation such as a utility system losing a large generator or a transmission line tripping. In one example, the deadband is set a plus or minus 0.12 Hz off the center point frequency. The selection of this limit is typically based on factors such as the location and nature of the power generation system and the variability of frequency center points. Stabilization system 21 may have a variable limit that is set by the end user after taking into account such factors.

Power shaper 33 provides a signal for turbine control 31 to transiently boost power while staying within energy source operating constraints and limiting coupling between grid oscillatory modes and energy source mechanical modes. Although the word "power" is used, torque could alternatively be used for the same effect, and power as used herein is meant to encompass torque. The system may be set up to be based on power throughout, torque throughout, or a combination of power and torque. For example, in one specific embodiment, the control is done for a power response, but implementation is such that wind turbine obtains a torque command that corresponds to the desired power control.

Mechanical oscillations are a common concern in power systems. Such systems may be characterized by an elemental rotating system consisting of two inertias connected by a spring. The spring can be a physical shaft or the behavior of generators interconnected by a transmission network. More specifically, a wind turbine has some inertia in the wind turbine hub end and some inertia in the wind turbine generator with the shaft between them being susceptible to spring type motion and oscillatory modes. Additionally, other generators on the utility system have respective inertias that may result in oscillatory modes. Such oscillatory modes may perturb the utility grid frequency.

Power shaper 33 is configured to shape a pulse in response to the frequency event and decrease the frequency disturbance magnitude in the power generation system. Although the shaper may be made to address either positive or negative frequency events, the shaper will be particularly useful in embodiments addressing negative frequency events because less alternatives (other than curtailed power operation) exist to momentarily increase power above nominal.

In the specific embodiment of FIG. 3, the adjustment signal comprises two signals and, more specifically, a torque command $\Delta T$ and a turbine speed command $\Delta S$. In other embodiments the adjustment signal comprises at least one of a power command, a torque command, and a speed command. The adjustment signal is typically further constrained so as to limit oscillatory coupling. In one example, as discussed below with respect to FIGS. 5 and 6, a "fast up, slow down" shaping characteristic is used so that the adjustment signal behaves like a filter such that, if the grid frequency is oscillating, then the profile does not make the oscillations worse. If the grid is oscillatory but at a level smaller than the deadband, no adjustment signal is generated. If the grid is oscillatory and larger than the deadband, than the shaping characteristic prevents the compounding of the oscillation. The shape of the power adjustment signal will be controlled by gain and ramp values that will typically vary with application, due to differing utility requirements and responses.

Limit controller 29 is used to prevent turbine over and under speed operation. Most wind turbines have a predetermined speed range. One example is 870 rpm to 1600 rpm. The goal when the operating constraint is generator rotor speed is to ensure that no request is processed for additional power when the generator is below a minimum speed limit and that no control signal for reducing power is processed when the generator is above a maximum speed limit. In one embodiment, limit controller 29 comprises a limit adjuster 40 to change the bounds of limiter 34 in response to the generator speed. Limit controller 29 may further comprise a filter 36 configured to generate turbine speed command $\Delta S$ to elicit a power response from the wind turbine as a function of frequency variation in the utility grid. Finally, limit controller 29 may comprise a divider 38 to use the power command from limiter 34 and divide by the speed of the generator to obtain torque command $\Delta T$. Generator speed is one example of an operating constraint. Other constraints may be used in addition or alternatively, as discussed below.

In the embodiment of FIG. 3, input frequency washout 35, deadband limiter 25, and power shaper 33 are situated to the left of dividing line 37 with central controls of a wind plant, whereas limit controller 29 is situated closer to the individual turbine and turbine controls. However, line 37 may be moved at any appropriate position in the system as discussed in more detail below, and one or more control units may comprise any combination of the control blocks.

Figure 4:
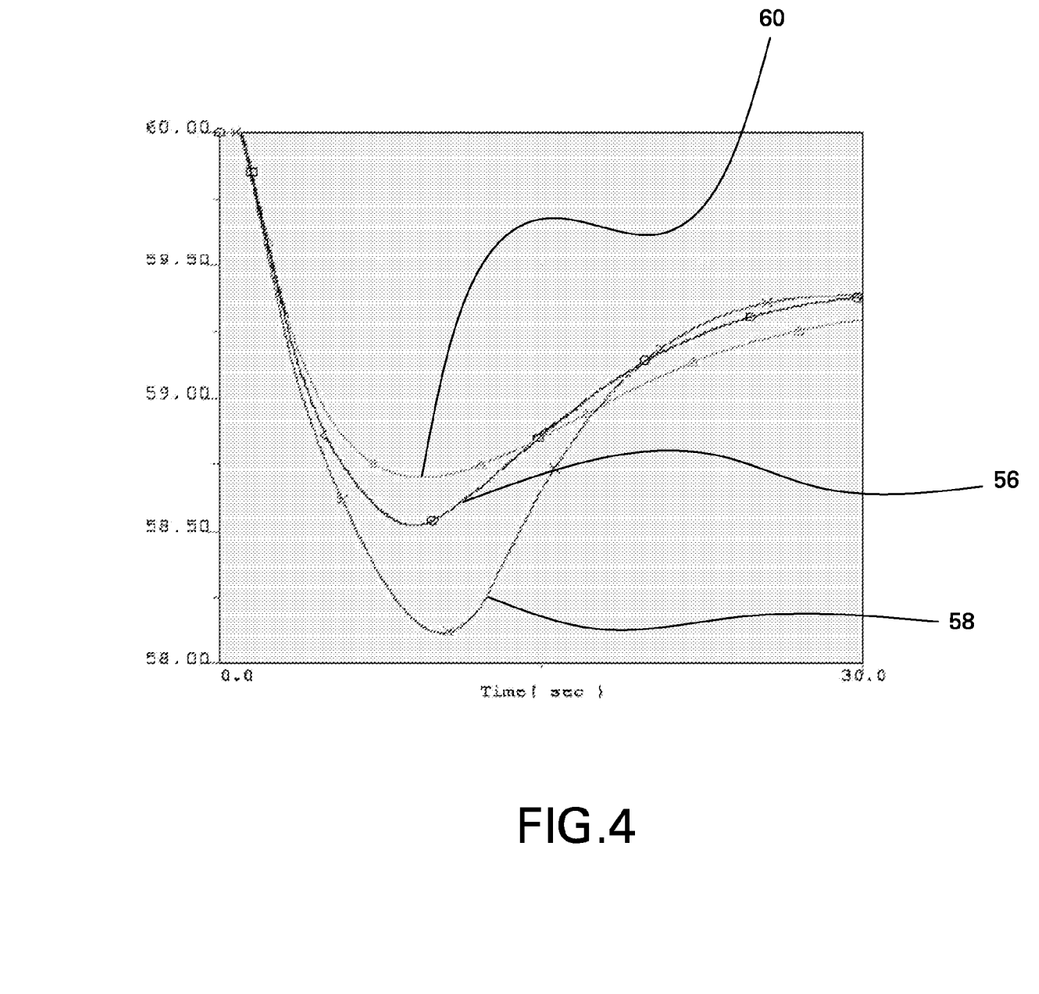
FIG. 4 is a simulated graph illustrating an expected response to power shaping.

FIG. 4 is a simulated graph illustrating expected response to power shaping. Curve 56 illustrates a simulated power system response to a frequency dip without wind power coupling. Curve 58 illustrates a simulated system response when 90% conventional power and 10% of wind power are used and subjected to a frequency dip without the active power controls described herein. Curve 60 illustrates a simulation of embodiments with of wind power and active power controls.

Figure 5:
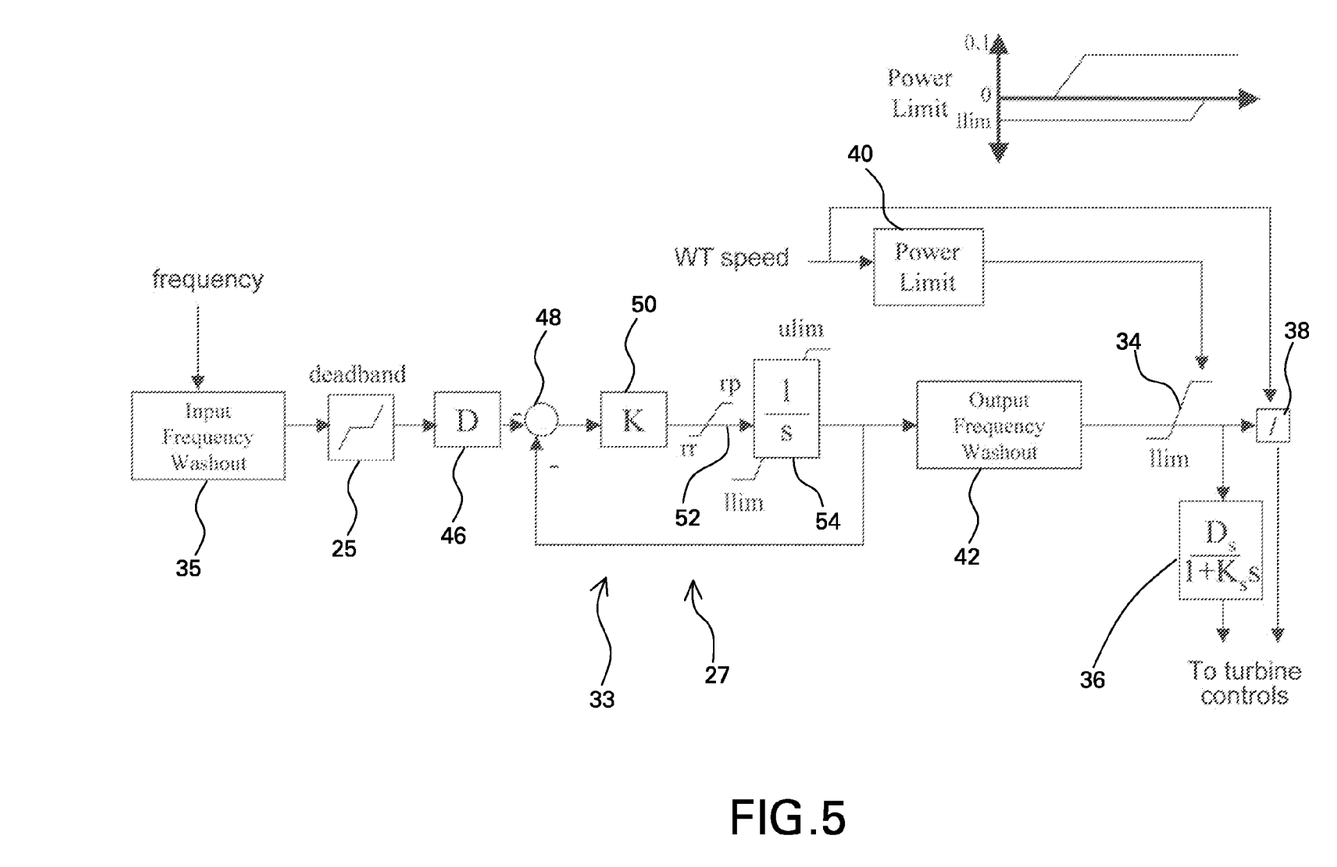
FIG. 5 is a more detailed block diagram of a more specific control system embodiment disclosed herein.

FIG. 5 is a more detailed block diagram of a specific embodiment disclosed herein wherein an output frequency washout 42 is configured to drive an adjustment signal $\Delta P$ to zero. Output frequency washout 42 is shown in the illustrated position for purposes of example only and may be present in any appropriate control block. For example, in another embodiment, the washout function may be included within control loop 27. In the embodiment of FIG. 5, power shaper 33 comprises a gain block 46 and a control loop 27 used to provide a shaping response which is faster upon initiation and slower upon recovery (in other words "fast up, slow down"). The gain of block 46 may vary and will typically be set according to location and system requirements.

Within control loop 27, gain block 50 and ramp limiter 52 are used to control the rate of signal adjustment for integrator 54. The gain of block 50 is typically a fixed value designed to control the response of the control loop. In ramp limiter 52, the rp limit is designed to provide a sufficiently large positive ramp-up rate to provide the compensation, and the rr limit is designed to provide a sufficiently small negative ramp-down rate in order to avoid oscillatory compounding as discussed above. Thus, the frequency is quickly compensated for upon an event, but the power adjustment after the event recovers slowly.

Figure 6:
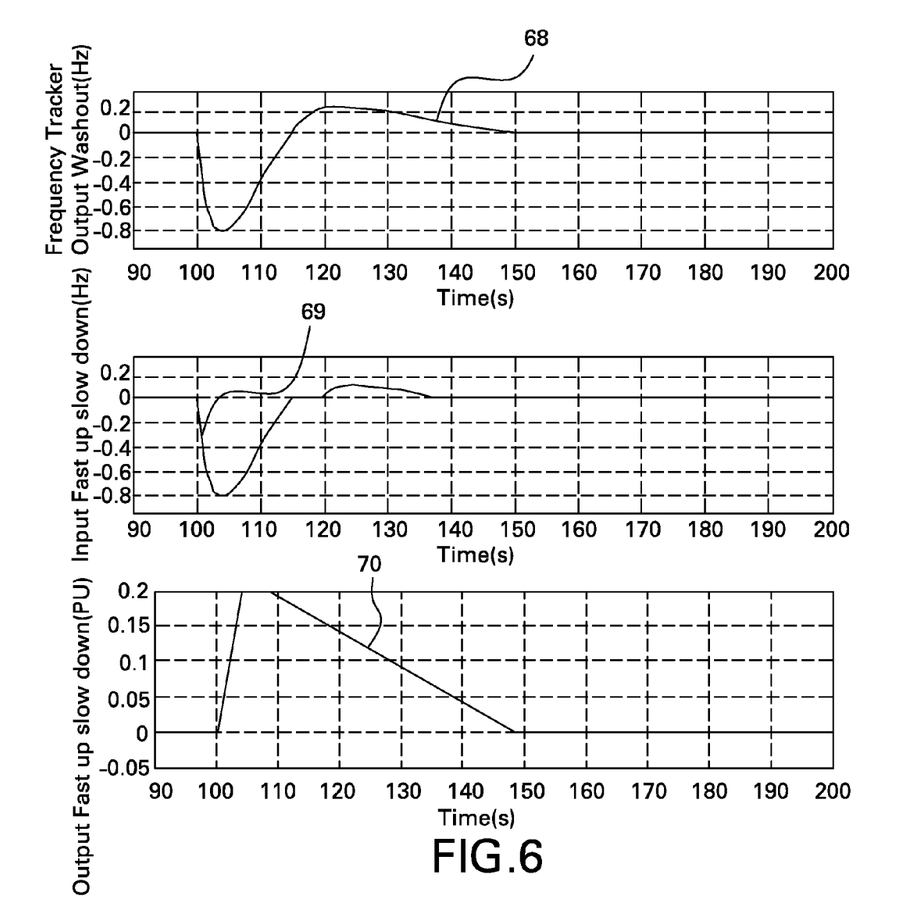
FIG. 6 illustrates simulated graphs associated with a power adjustment signal.
Figure 7:
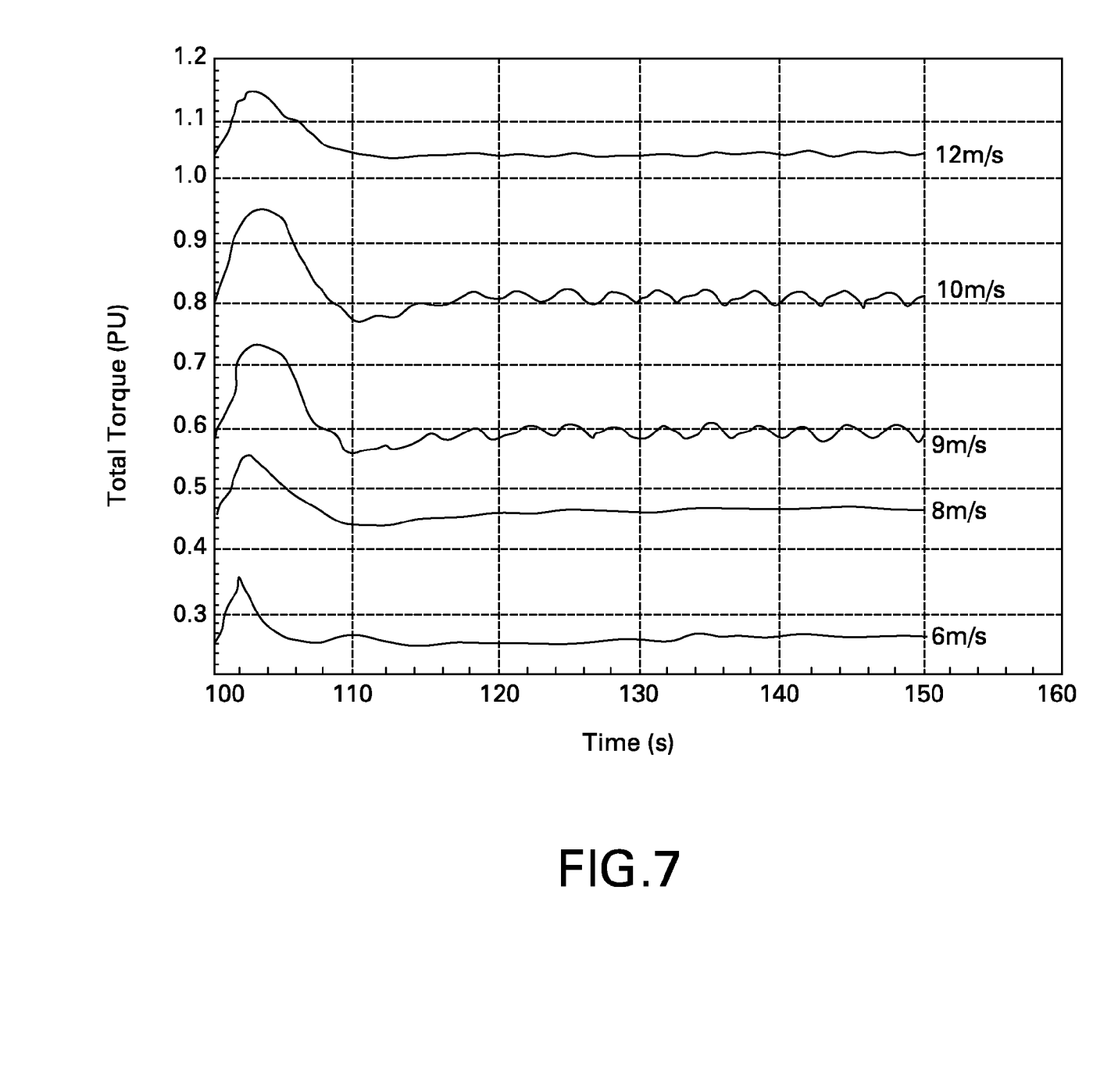
FIG. 7 is a simulated graph of torque versus time that is expected to result when using embodiments disclosed herein at various wind speeds.

Several example simulated waveforms are shown in FIG. 6. Curve 68 shows the input frequency washout output for a simulated event initiated at a time of 100 seconds. Curves 69 and 70 illustrate the deadband limiter and power shaper output signals, respectively, for the same simulated event. FIG. 7 illustrates a simulated response of torque versus time at various wind speeds for the frequency event described in FIG. 6.

Referring again to FIG. 5, gain block 46 and ramp limiter 52 define the pulse shape and may be varied based on system needs or conditions. For example, in one embodiment, at least one of the parameter settings 46 and 52 is configured for having a variable value in response to at least one of a utility condition, a utility command, generator speed, and air density.

In addition to speed constraints, other operating constraints may include, for example, constraints such as turbine torque (magnitude and time) constraints, ramp rate constraints, and blade pitch operating constraints. Torque constraints are typically set based on turbine design (that is, by how much and for how long a turbine can withstand exceeding its rated operating point). Output washout unit 42 and ramp limiter 52 can be used to build in protections for such operating constraints. In one embodiment, an example torque magnitude range is from 0 Nm to 11020 Nm.

Various options exist for distributed and system (or "central") level control. In one embodiment, the deadband limiter, the power shaper, and the limit controller are embodied in a power generation system controller 32 (FIG. 2). In another embodiment, the deadband limiter, the power shaper, and the limit controller are embodied in a controller 24 of an energy source 14 (FIG. 2). As another alternative, a separate controller (not shown) may be coupled to either the system controller 32 or the source controller 24, or the various control sub-units/functions may be spread among several controllers.

Likewise, frequency estimation may be centralized or distributed. In other words, a frequency signal may be obtained by any desired means with several examples including: measurements at the energy source, measurements at a substation point 19 (FIG. 2), measurements at the utility connection, or information from the utility. Typically, measurements are obtained at a substation because power fluctuations will tend to modulate apparent frequency (defined as the rate of change of voltage angle) differently at each turbine.

In an example method embodiment, a stabilization method for a wind power generation system including a stabilization system of the type described with respect to FIG. 3 includes: detecting when a frequency or voltage signal is outside of a respective signal range; providing a transient shaped power generation adjustment signal in response to the signal being outside of the respective signal range while not causing the wind power generator to rotate at a speed outside of a speed range. In a more specific embodiment, the adjustment signal comprises at least one of a torque command and a speed command.

In summary, embodiments disclosed herein may be used to monitor variation of at least one signal in the grid and respond in a way to reduce large signal changes subject to limits of: thermal capability of the power conversion equipment, oscillatory modes, speed limits, or other operating constraints.

As used herein, the singular forms "a," "an" and "the" include plural referents unless the context clearly dictates otherwise.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A stabilization system for a wind power generation system including a wind power generator, the stabilization system comprising:
a deadband limiter for detecting when a signal is outside of a respective signal range, wherein the signal comprises a frequency;
an input frequency washout for calculating a frequency deviation for use by the deadband limiter to set the respective signal range;
a power shaper for providing a transient power generation adjustment signal for temporarily boosting the supplied power in response to the signal being outside of the respective signal range; and
a limit controller for preventing the adjustment signal from causing the wind power generator to operate outside of at least one operating constraint.

2. The stabilization system of claim 1 wherein the at least one operating constraint includes a generator rotation speed range.

3. The stabilization system of claim 1, further comprising an output frequency washout for driving the adjustment signal to zero.

4. The stabilization system of claim 2 wherein the adjustment signal comprises at least one command comprising a power command, a torque command, a turbine speed command, or combinations thereof.

5. The stabilization system of claim 2 wherein the adjustment signal comprises a torque command and a turbine speed command.

6. The stabilization system of claim 1 wherein the power shaper limits coupling between grid oscillatory modes and energy source oscillatory modes.

7. The stabilization system of claim 1 wherein the deadband limiter, the power shaper, and the limit controller are embodied in a wind plant level controller.

8. The stabilization system of claim 1 wherein the deadband limiter, the power shaper, and the limit controller are embodied in a wind turbine level controller.

9. The stabilization system of claim 1 wherein the power shaper comprises at least one gain element or parameter having a variable value in response to at least one of a utility condition, a utility command, generator speed, and air density.

10. A stabilization system for a power generation system including a non-conventional energy source coupled to a utility grid, the stabilization system comprising:
a deadband limiter for detecting when a signal of the power generation system is outside of a frequency signal range while the non-conventional energy source is supplying power to a grid;
an input frequency washout for calculating a frequency deviation for use by the deadband limiter to set the respective signal range;
a power shaper for providing a transient power generation adjustment signal to temporarily boost the supplied power in response to the signal being outside of the signal range; and
a limit controller to for preventing the adjustment signal from causing the energy source of the power generation system to operate outside of at least one operating constraint.

11. The stabilization system of claim 10 wherein the energy source comprises a wind turbine that has a rotating inertia decoupled from the utility grid by a power electronic converter.

12. The stabilization system of claim 10 wherein the energy source comprises a wind turbine, a battery energy storage system, a microturbine, or a fuel cell.

13. A stabilization method for a wind power generation system including a wind power generator, the stabilization method comprising:
detecting when a frequency signal is outside of a respective signal range while the wind power generator is supplying power to a grid;

an input frequency washout for calculating a frequency deviation for use by the deadband limiter to set the respective signal range;

providing a transient power generation adjustment signal to temporarily boost the supplied power in response to the frequency signal being outside of the respective signal range while not causing the wind power generator to rotate at a speed outside of a speed range.

14. The stabilization method of claim 13 wherein the adjustment signal comprises two commands, wherein a first one of the two commands comprises a turbine speed command, and wherein a second one of the two commands comprises a power or torque command.

* * * * *